(12) United States Patent
Bordes et al.

(10) Patent No.: US 8,369,397 B2
(45) Date of Patent: Feb. 5, 2013

(54) METHOD AND DEVICE FOR CODING A VIDEO CONTENT COMPRISING A SEQUENCE OF PICTURES AND A LOGO

(75) Inventors: Philippe Bordes, Laille (FR); Philippe Guillotel, Vern sur Seiche (FR); Franck Hiron, Chateaubourg (FR)

(73) Assignee: Thomson Licensing, Boulogne-Billancourt (FR)

(*) Notice: Subject to any disclaimer, the term of this patent is extended or adjusted under 35 U.S.C. 154(b) by 1026 days.

(21) Appl. No.: 11/988,283

(22) PCT Filed: Jul. 3, 2006

(86) PCT No.: PCT/EP2006/063808
§ 371 (c)(1), (2), (4) Date: Feb. 4, 2009

(87) PCT Pub. No.: WO2007/003627
PCT Pub. Date: Jan. 11, 2007

(65) Prior Publication Data
US 2009/0180702 A1    Jul. 16, 2009

(30) Foreign Application Priority Data

Jul. 6, 2005  (FR) .................................. 05 52069
Jan. 4, 2006  (EP) .................................. 06290025

(51) Int. Cl.
*H04N 7/12* (2006.01)
(52) U.S. Cl. ........................................ 375/240; 382/196
(58) Field of Classification Search ............... 375/240.1
See application file for complete search history.

(56) References Cited

U.S. PATENT DOCUMENTS

| 6,665,873 | B1* | 12/2003 | Van Gestel et al. ............ 725/136 |
| 2001/0037465 | A1* | 11/2001 | Hart et al. ..................... 713/201 |
| 2003/0067637 | A1* | 4/2003 | Hannuksela .................. 358/504 |
| 2004/0075668 | A1* | 4/2004 | Van Der Meer et al. ...... 345/601 |
| 2005/0123055 | A1* | 6/2005 | Winger .................... 375/240.25 |
| 2006/0039483 | A1* | 2/2006 | Lee et al. ................ 375/240.28 |
| 2006/0233239 | A1* | 10/2006 | Sethi et al. ............... 375/240.03 |
| 2007/0030996 | A1* | 2/2007 | Winger et al. ................. 382/100 |
| 2007/0053438 | A1* | 3/2007 | Boyce et al. ............. 375/240.24 |
| 2008/0095228 | A1* | 4/2008 | Hannuksela et al. .... 375/240.01 |
| 2009/0180702 | A1* | 7/2009 | Bordes et al. ................. 382/239 |

FOREIGN PATENT DOCUMENTS

| JP | 2002524985 | 8/2002 |
| WO | WO0014967 | 3/2000 |
| WO | WO2005004493 | 1/2005 |

* cited by examiner

*Primary Examiner* — Eleni Shiferaw
*Assistant Examiner* — Abu Sholeman
(74) *Attorney, Agent, or Firm* — Tutunjian & Bitetto, P.C.

(57) ABSTRACT

A method and device for coding a video content a having sequence of pictures and at least one logo is provided. The method includes coding the sequence of pictures by a first coding method, where this step generates coded data relating to the sequence of pictures. The logo is coded by a second coding method and additional information relating to the logo, the additional information including at least information relating to the positioning of the logo in the pictures of the sequence, where this step generates coded data relating to the logo. A single data stream is generated and separately includes the coded data relating to the logo and the coded data relating to the sequence of pictures.

14 Claims, 6 Drawing Sheets

FIG. 1 – State of the art

METHOD AND DEVICE FOR CODING A VIDEO CONTENT COMPRISING A SEQUENCE OF PICTURES AND A LOGO

This application claims the benefit, under 35 U.S.C. §365 of International Application PCT/EP2006/063808, filed Jul. 3, 2006, which was published in accordance with PCT Article 21(2) on Jan. 11, 2007 in English and which claims the benefit of French patent application No. 0552069, filed Jul. 6, 2005 and which claims the benefit of European patent application No. 06290025.3, filed Jan. 4, 2006.

1. FIELD OF THE INVENTION

The invention relates to a device and a method for coding a video content comprising a sequence of pictures and a logo able to generate a stream of coded data. It also relates to a method and a device for decoding the stream of coded data generated by the method and the coding device according to the invention.

2. STATE OF THE ART

A video content crosses various networks between its creation and its distribution to the end user. A video content is, for example, a film or more generally a sequence of pictures into which is possibly inserted a logo. In general, after its creation in the studio the video content is distributed via a so-called contribution network to the transmitters. On this network, the contents are manipulated and/or transformed by picture professionals (content creators, studios, transmitters, etc). Subsequently, the content, possibly transformed, is dispatched by the transmitters via distribution networks towards the end users.

In a general manner, the video content undergoes several transformations between its creation (for example, by acquisition with a camera or by picture synthesis) and its transmission to the end user (for example to the television of a viewer). Rapidly after its creation, the content is generally compressed at high bit rate so as to minimize the costs of storage and/or of transfer, the latter being limited by the bandwidth of the network. The compression of the video content at high bit rate makes it possible in particular not to degrade its initial quality. Moreover, this content generally undergoes various processings such as for example the insertion of logos by the creator of the content. Moreover, with the proliferation of television channels and the diversity of distribution networks (cable, RF, satellite, Internet, etc), this content is often sold/deployed on different networks by different companies that also want to insert their own logo. Typically, television channels buy contents for a certain duration so as to be able to transmit under certain conditions. Frequently, the channel that buys a video content already comprising a logo conceals or deletes this logo. It may also desire to insert its own logo. Currently, the logo forms part of the pictures of the sequence and is hence coded with the latter. The techniques of deleting and concealing a logo are hence complicated since they require the decoding of the video content. Thus the technique of concealing a logo requires the decoding of the video content (i.e. of the sequence of pictures and hence of the logo), the concealing of the existing logo with a new logo and the re-encoding of the whole. Likewise, the insertion of a logo into an already coded sequence of pictures requires the decoding of this sequence, the insertion of the logo into the pictures of the sequence and the re-encoding of the whole. Furthermore, all its techniques introduce numerous visual faults (for example blurring effect) due in particular to the concealment technique used and to the re-encoding of the content.

3. SUMMARY OF THE INVENTION

The invention is aimed at alleviating at least one of these drawbacks. For this purpose, the invention proposes a method for coding a video content which in particular makes it possible to avoid the succession of steps of decoding and of re-encoding when one desires, for example, to add logos to the video content or delete them from the latter.

The invention relates to a method for coding a video content comprising a sequence of pictures and at least one logo itself comprising at least one picture. The method comprises a step for coding the sequence of pictures which generates a stream of coded data relating to the sequence of pictures. The method further comprises the following steps:

coding the logo and additional information relating to the logo, the additional information comprising at least information relating to the positioning of the logo in the pictures of the sequence, said step generating coded data relating to the logo; and     generating a single video data stream comprising separately the coded data relating to the logo and the coded data relating to the sequence of pictures by inserting the coded data relating to the logo directly in the stream of coded data relating to the sequence of pictures.

Advantageously, no additional time synchronization information is required for synchronizing the coded data relating to the logo and coded data relating to the pictures.

Advantageously, the coded data relating to the logo are coded as a message of SEI type.

Preferentially, the additional information relating to the logo furthermore comprises information relating to the initial size of the logo.

In a specific embodiment, the additional information relating to the logo furthermore comprises information making it possible to manage the transparency of the logo during its display and information relating to the display size of the logo.

The sequence of pictures is preferentially coded with a coding method compatible with one of the coding standards belonging to the set of standards comprising:

MPEG-2;
    MPEG-4 part 2; and
    MPEG-4 AVC.

The logo is advantageously coded with a coding method compatible with one of the coding standards belonging to the set of standards comprising:

MPEG-2;
    MPEG-4 part 2;
    MPEG-4 AVC;
    JPEG; and
    JPEG 2000.

The method also relates to a coding device for coding a video content comprising a sequence of pictures and at least one logo itself comprising at least one picture. The coding device comprises means for coding the sequence of pictures, said means generating a stream of coded data relating to the sequence of pictures. The coding device further comprises:

means for coding the logo and additional information relating to the logo, the additional information comprising at least information relating to the positioning of the logo in the pictures of the sequence, said means generating coded data relating to the logo; and     means for generating a single video data stream comprising separately the coded data relating to the logo and the coded data relating to the sequence of pictures by inserting the coded data relating to the logo directly in the stream of coded data relating to the sequence of pictures.

The invention also concerns a stream of data coded in accordance with a syntax of MPEG type, comprising at least one first part of coded data relating to a sequence of pictures wherein it comprises separately a second part of coded data relating to a logo coded as a message of SEI type, called SEI message.

Advantageously, the SEI message comprises at least one field relating to the positioning in the horizontal direction of the logo in the pictures of the sequence, and at least one field relating to the positioning in the vertical direction of the logo in the pictures of the sequence.

4. LISTS OF FIGURES

The invention will be better understood and illustrated by means of wholly non limiting advantageous exemplary embodiments and modes of implementation, with reference to the appended figures in which.

5. DETAILED DESCRIPTION OF THE INVENTION

The invention relates to a method for coding a video content comprising a sequence of pictures and a logo. A logo is either a picture or a sequence of pictures, each picture comprising one or more components, for example a luminance component Y and two chrominance components U and V. Each component can itself be represented in the form of a picture consisting of pixels or picture points with each of which is associated a value (for example a value Y of luminance or a value U or V of chrominance). More precisely, the method according to the invention consists in coding one or more logos independently of the sequence of pictures. The invention consists also in generating a coded data stream in which the coded data relating to the sequence of pictures and the coded data relating to the logo are separated so as to be able to identify them clearly in the data stream. For this purpose, additional information relating to the logo is coded and added to the stream of coded data relating to the sequence of pictures so as to form a single stream of coded data. This coded additional information allows a decoding method to reconstruct the logo to be inserted into the sequence of decoded pictures, to determine its position in the latter, and possibly to re-dimension it. This additional information can also make it possible to manage particular visual effects such as transparency effects (also known as "blending" or "alpha blending") which make it possible to see a picture through another picture.

Figure 1:
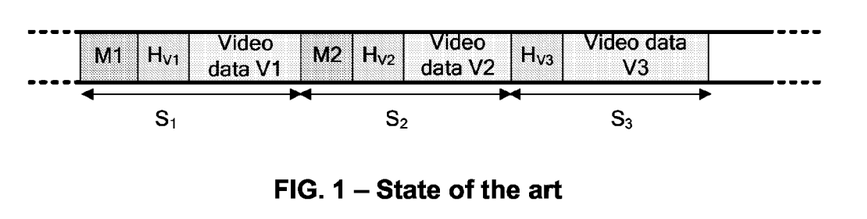
FIG. 1 represents a data stream coded according to the state of the art.
Figure 2:
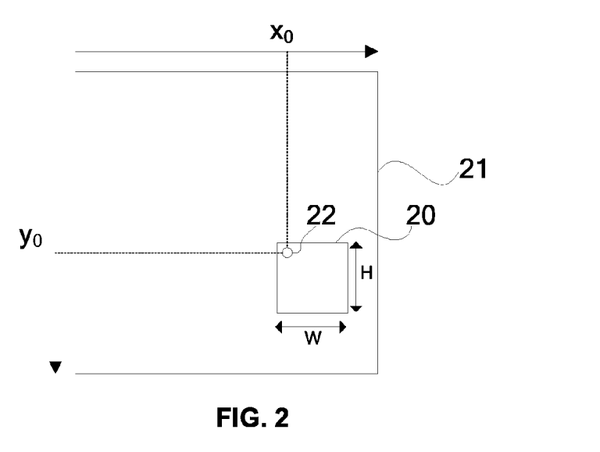
FIG. 2 represents the position of a logo in a picture of a sequence of pictures.

Typically, a stream of coded data is a concatenation of subsets of bits. According to a first embodiment, the sequence of pictures is coded by a first coding method (for example MPEG-2, MPEG-4 AVC, etc) so as to generate a stream of coded data relating to this sequence, called video elementary stream. This first coding method can be any coding method making it possible to code a sequence of pictures. FIG. 1 illustrates such a stream of coded data relating to a sequence of pictures. In this figure three subsets of bits referenced $S_1$, $S_2$ and $S_3$ are represented. They begin optionally with a synchronization marker referenced M1 or M2 allowing random access in the stream, a header referenced $H_{V1}$, $H_{V2}$ or $H_{V3}$ and data, referenced V1, V2 or V3, corresponding to the compressed and coded content of the pictures of the sequence. The invention consists hence in coding additional information relating to the logo in an independent and different manner from the coded data relating to the sequence of pictures. The coded additional information relating to the logo comprises the various components of the logo coded by a second method for coding pictures and additional information which is also coded. This additional information comprises in particular information making it possible to position the logo in the pictures of the sequence. For example, with reference to FIG. 2, a logo 20 is inserted into a picture 21 so that the abscissa and the ordinate of the pixel 22 situated in the top left corner of the logo are respectively equal to $x_0$ and $y_0$. The various components of the logo 20 and the information (i.e. $x_0$ and $y_0$) relating to the position of the logo in the pictures of the sequence are hence coded. The additional information also comprises information (i.e. width W and height H) relating to the initial size of the logo which may be necessary in certain cases and must then be coded in the stream. The initial size of the logo is defined as being the size of the logo such as it is coded in the stream of coded data. Advantageously, other additional information may be coded such as for example the size, width $W_d$ and height $H_d$ of display of the logo in the pictures of the sequence which may be different from the initial size in the case of a re-dimensioning of the logo, as well as data relating to the management of transparency. The management of transparency, for example alpha blending technique, consists either in coding a unique transparency value for the entire logo (for example 0.8) or else in coding a different value for each pixel belonging to the logo as in alpha blending technique. In the latter case, the transparency is then an additional component of the logo and is coded like the other components of the logo such as the luminance component and the chrominance components.

Figure 3:
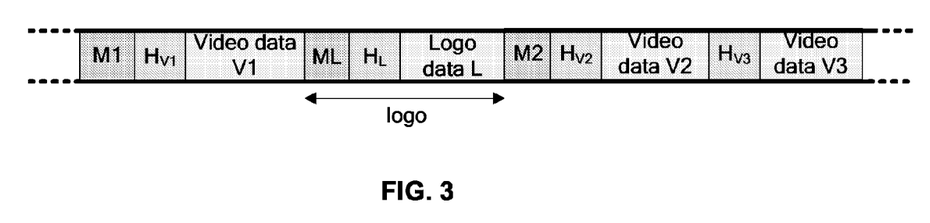
FIG. 3 represents a data stream coded according to the invention comprising data relating to a logo.

The additional information is coded according to its type (i.e. position, components of the logo, initial size of the logo, etc) either in a header referenced $H_L$ in FIG. 3, or in a subset of bits referenced L. Thus, the additional information such as the position, the initial size and display size of the logo, and possibly the transparency value if it is unique is coded in the header referenced $H_L$ in FIG. 3. The additional information relating to the various components of the logo, possibly including the component relating to the transparency, is coded subsequent to the header $H_L$ in L. The header $H_L$ can itself be preceded by a marker referenced ML allowing random access in the stream. The coded data relating to the logo (i.e. header $H_L$, data L, and possibly markers ML) are added by inserting directly in the coded data relating to the sequence of pictures so as to generate a single stream of coded data as illustrated by FIG. 3. The logo generally remaining fixed for long periods, an advantageous implementation consists in adding/inserting the coded data relating to the logo directly in the stream of coded data relating to the sequence of pictures only at the random access points (or RAPs). These random access points are for example pictures of IDR type ("Instantaneous Decoding Refresh") or I type in a stream in accordance with the MPEG4 AVC standard also known by the name H.264 defined in the document ISO/IEC 14496-10 entitled "Information technology—Coding of audio-visual objects—Part 10: Advanced Video Coding" and transport packets TS marked RAI ("Random Access Indicator") in the MPEG2-TS transport layer defined in the document ITU T Rec. H.222.0|ISO/IEC 13818 1 (2rd edition, 2000) entitled "Information Technology—Generic Coding of moving pictures and associated audio: Systems". Thus, after the decoding of the stream of coded data, the decoded logo is, for example, inserted on all the decoded pictures of the sequence which follow the first random access point RAP1 decoded just before the logo. It is also conceivable to insert this logo on all the decoded pictures of the sequence which follow RAP1 until the next random access point or else in the case of several logos until the next random access point.

An exemplary embodiment is proposed within the framework of the MPEG4 AVC coding standard using SEI messages (SEI stands for "Supplemental Enhancement Information"). The standard defines a syntax that any stream of coded data must comply with to be compatible with this standard. The syntax defines in particular how the various items of information are coded (for example the data relating to the pictures included in the sequence, the motion vectors, etc). The sequence of pictures is hence coded according to a first coding method in accordance with this standard so as to generate a stream of coded data relating to this sequence. Furthermore, the standard defines in annex D of the document ISO/IEC 14496-10 the way in which additional information termed SEI is coded. This additional information used for the manipulation of a sequence of pictures is referenced in the syntax by a field called payloadType. It makes it possible to define new functionalities in particular of display. Note that if the decoding device does not possess the functionalities necessary for its use, this information is ignored. The invention consists hence in defining a new type of information SEI so as to code the additional information relating to the logo. This information coded independently of the sequence of pictures is added/inserted in the stream of coded data relating to this sequence, i.e. is multiplexed with the stream of coded data relating to this sequence. For this purpose, a new value for the field payloadType is defined from among the values not yet used (for example payloadType equal to 22). Specifically, the first 22 values of payloadType (from 0 to 21) are already used to code particular information such as for example the characteristics of the grain of the film which correspond to a payloadType equal to 19. The new syntax is exhibited below in an array in the form of a pseudo-code with the same conventions as in the document ISO/IEC 14496-10. In particular, the operator '==' signifies "equal to". The operator '!' is the "NOT" logical operator. In this array, the added information relating to the logo is in italics.

The syntax of the SEI data (i.e. sei_payload) is extended in the following manner:

| sei_payload( payloadType, payloadSize ) { | C | Descriptor |
|---|---|---|
|   if( payloadType == 0 ) | | |
|     buffering_period( payloadSize ) | 5 | |
|   ..... | | |
|   else if( payloadType == 21 ) | | |
|     stereo_video_info( payloadSize ) | 5 | |
|   else if ( payloadType == 22 ) | | |
|     *logo_info( payloadSize )* | 5 | |
|   else | | |
|     reserved_sei_message( payloadSize ) | 5 | |
|   if( !byte_aligned( ) ) { | | |
|     bit_equal_to_one /* equal to 1 */ | 5 | f(1) |
|     while( !byte_aligned( ) ) | | |
|       bit_equal_to_zero /* equal to 0 */ | 5 | f(1) |
|   } | | |
| } | | |

The syntax of the SEI message (logo_info) containing the information relating to the logo is defined in the following manner:

| Logo_info( payloadSize ) { | | C | Descriptor |
|---|---|---|---|
| pic_width_msb | | 5 | u(4) |
| pic_width_lsb | | 5 | u(8) |
| pic_height_msb | | 5 | u(4) |
| pic_height_lsb | | 5 | u(8) |
| pic_start_w_msb | $H_L$ | 5 | u(4) |
| pic_start_w_lsb | | 5 | u(8) |
| pic_start_h_msb | | 5 | u(4) |
| pic_start_h_lsb | | 5 | u(8) |
| pic_transparency | | 5 | u(8) |
| pic_format | | 5 | u(8) |
| if (pic_format == 0) { | | | |
|   data_pic_avc( payloadSize ) | | | |
| } | L | | |
| else if (pic_format == 1) { | | | |
|   data_pic_jpeg( payloadSize ) | | | |
| } | | | |
| } | | | | payloadSize represents the number of bytes used to code the logo or more precisely its various components (for example the luminance component and the two chrominance components, possibly the transparency component).

pic_width_msb represents the high-order bits of the initial width in number of pixels of the logo to be inserted.

pic_width_lsb represents the low-order bits of the initial width in number of pixels of the logo to be inserted.

pic_height_msb represents the high-order bits of the initial height in number of pixels of the logo to be inserted.

pic_height_lsb represents the low-order bits of the initial height in number of pixels of the logo to be inserted.

pic_start_w_msb represents the high-order bits of the position along the horizontal axis ($x_0$ with reference to FIG. 2) of the first pixel of the logo (i.e. situated in the corner of the logo at the top left) which must be inserted into the pictures of the sequence.

pic_start_w_lsb represents the low-order bits of the position along the horizontal axis ($y_0$ with reference to FIG. 2) of the first pixel of the logo which must be inserted into the pictures of the sequence.

pic_start_h_msb represents the high-order bits of the position along the vertical axis of the first pixel of the logo which must be inserted into the pictures of the sequence.

pic_start_h_lsb represents the low-order bits of the position along the vertical axis of the first pixel of the logo which must be inserted into the pictures of the sequence.

pic_transparency represents the transparency coefficient used to insert the logo into the pictures of the sequence.

pic_format specifies the coding format used to code the logo. This format is specified by the array below which can be for example extended to other coding formats. Thus the array can be completed by adding a coding format referenced pic_format=2 corresponding to the format of intra syntax MPEG-2 encoding.

| pic_format | Encoding format |
|---|---|
| 0 | AVC intra syntax |
| 1 | JPEG |
| ... | ... |

Thus the array can be completed by adding a coding format referenced pic_format=2 corresponding to the format of intra syntax MPEG-2 encoding.

The pictures representing the various components of the logo are divided into macroblocks (i.e. block of pixels) each coded in accordance with the coding format defined by the field pic_format according to a second coding method. This field may advantageously be coded before the other fields so that the decoder knows when pic_format=1 that some of the following fields (e.g. pic_width_msb, pic_width_lsb, pic_height_msb, and pic_height_lsb) are not present in the stream.

data_pic_avc(payloadSize) SEI message syntax represents a part of stream of data coded in accordance with the H.264/AVC syntax describing the set of macroblocks of the logo coded in intra mode.

data_pic_jpeg(payloadSize) SEI message syntax represents a part of stream of data coded in accordance with the JPEG syntax describing the set of macroblocks of the logo. In the case where the logo is coded in accordance with this syntax, the fields relating to the initial size of the logo (pic_width_msb, pic_width_lsb, pic_height_msb, and pic_height_lsb) may possibly not be present in the stream in so far as this information is already coded in the part of stream data_pic_jpeg(payloadSize). By adding a SEI message for each image it is then possible to handle animated logos. In the example above, the transparency is managed by way of a single coefficient coded by the field pic_transparency. In this case one and the same value is used for the set of pixels of the logo. According to another embodiment, the transparency is managed as an additional component of the logo. In this case, a transparency value is associated with each pixel of the logo. This additional component is then coded like the other components (for example luminance and chrominance) in the part of the stream corresponding to the logo data referenced L in FIG. 3 and the field pic_transparency is then not used. According to another embodiment, no transparency information is coded and the field pic_transparency is not used.

For certain applications, it may be desirable to re-dimension the logo after its decoding and before its insertion into the sequence of pictures. The logo being coded with an initial size of W by H pixels, it is then displayed in the pictures of the sequence with a display size of $W_d$ by $H_d$ pixels, $W_d$ (respectively $H_d$) possibly being greater or less than W (respectively H). In this case, it is necessary to code the width $W_d$ and the height $H_d$ of display of the logo. For this purpose, four additional fields (pic_disp_width_msb, pic_disp_width_lsb, pic_disp_height_msb and pic_disp_height_lsb) are added in the header HL, for example subsequent to the field pic_height_lsb, to code the display size of the logo, i.e. the size that the latter will have once inserted into the pictures of the sequence. The first two fields, pic_disp_width_msb and pic_disp_width_lsb, respectively represent the high-order and low-order bits of the display width in number of pixels of the logo to be inserted and the last two fields, pic_disp_height_msb and pic_disp_height_lsb, respectively represent the high-order and low-order bits the display height in number of pixels of the logo to be inserted.

Other embodiments are described below within the framework of MPEG-4 AVC coding standard. The video coding standard is described in the document ISO/IEC 14496-10 entitled <<Information technology—Coding of audio-visual objects—Part 10: Advanced Video Coding>>. These embodiments allow to handle animated logo, i.e. logos comprising a sequence of pictures. Transparency is supported using alpha blending technique if alpha pictures are present. If the number of pictures in the logo sequence is shorter than the number of pictures in the primary sequence, the logo sequence is looped. A primary picture contains the visual information (e.g. luminance, chrominance) relating to an image of the initial sequence to be coded.

The data associated to the logo are: the logo_id, the logo state, the logo picture(s), the alpha picture(s) if any, the pic_parameter_set_id used by these pictures and the position of the logo in the primary decoded pictures. The stream structure described in the standard document is well-known by a man skilled in the art (e.g. picture parameter set, sequence parameter set, network adaptation layer unit . . . ). A slice is a group of macroblocks. The network adaptation layer units are also well-known structures encapsulating video coding layer data (VCL data). Three MPEG-4 AVC specific elements used by the following embodiments are first presented: auxiliary coded pictures, redundant coded pictures and flexible macrobloc ordering, known as FMO.

Figure 5:
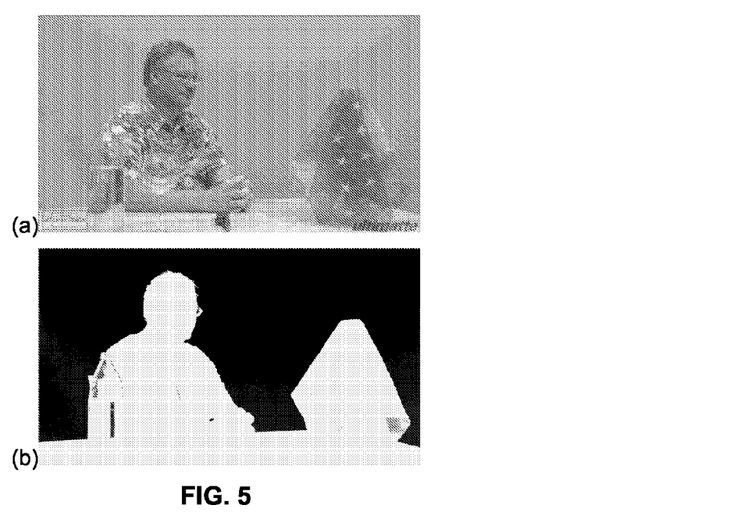
FIG. 5 (a) depicts a primary coded picture (a) and an auxiliary coded picture (b)

Originally, the auxiliary coded pictures were introduced in order to be used in applications requiring alpha blending. This functionality was added in FRext profile of MPEG-4 AVC as an optional tool. An auxiliary coded picture has the same syntactic and semantic restrictions as a monochrome redundant coded picture, and it must contain the same number of macroblocks as the primary coded picture. An example of such picture is illustrated by FIG. 5.

Syntax of Auxiliary Coded Pictures:

In a Sequence Parameter Set extension RBSP (SPSext) some parameters refer to the auxiliary coded pictures and specify the alpha blending formula to use:

```
...
aux_format_idc
if ( aux_format_idc != 0 ) { // (0: no auxiliary coded pictures)
    bit_depth_aux_minus8
    alpha_incr_flag
    alpha_opaque_value
    alpha_transparent_value
}
...
```

RBSP stands for Raw Byte Sequence Payload. It is a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

Figure 6:
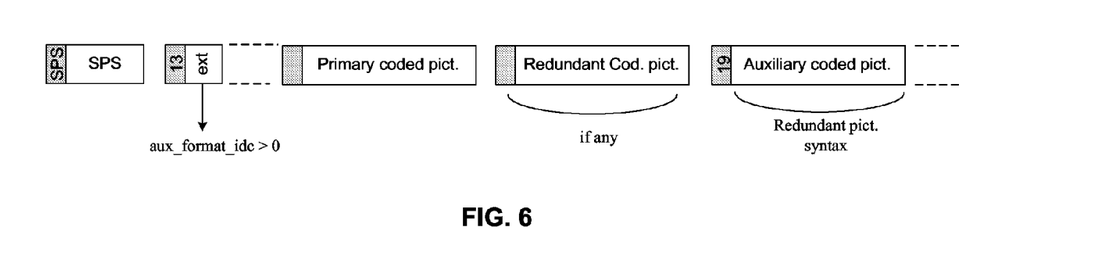
FIG. 6 depicts a bit-stream containing auxiliary coded pictures.

The auxiliary coded pictures have the same width and height as the primary coded pictures. There is exactly one auxiliary coded picture in each access unit of the coded video sequence. The nal_unit_type for auxiliary coded pictures is 19. The FIG. 6 depicts a stream containing such auxiliary coded pictures.

Redundant coded pictures are one of the error resilient tools introduced in the standard to enhance the robustness to packet loss. A redundant picture is a coded representation of a primary picture or a part of a primary picture. The content of the redundant picture will not be decoded except if the corresponding primary picture was lost due to packet loss. The redundant coded picture can be coded exactly the same way as the primary picture. However, it can also be coded with a lower quality using fewer bits.

Syntax of Redundant Coded Pictures:

In a Picture Parameter Set, redundant_pic_cnt_present_flag indicates whether redundant pictures are present or not.

In a slice header, if redundant_pic_cnt_present_flag==true and if redundant_pic_cnt>0 then the current slice belongs to a redundant coded picture.

Figure 7:
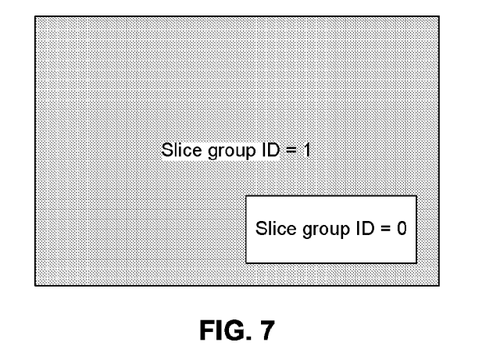
FIG. 7 depicts an example of FMO with slice_group_map_type=2 and num_slice_groups_minus 1=1.

The FMO is a tool that allows separating the coded pictures into several slices groups of different shape. An example of a picture using FMO tool is depicted on FIG. 7.

Syntax of FMO:

In a Picture Parameter Set, if num_slice_groups_minus1>0 then the pictures contain several slices. If slice_group_map_type==2, then the shape of slices is a rectangle.

```
if ( num_slice_groups_minus1>0 ) {
    slice_group_map_type = 2
    ...
    if ( slice_group_map_type == 2 )
        for( iGroup = 0; iGroup < num_slice_groups_minus1;
    iGroup++ ) {
            top_left[ iGroup ]
            bottom_right[ iGroup ]
        }
}
```

According to the following embodiments, the coded transparency and luminance/chrominance components of the logo are coded in separate NAL units from the SEI logo message.

Figure 8:
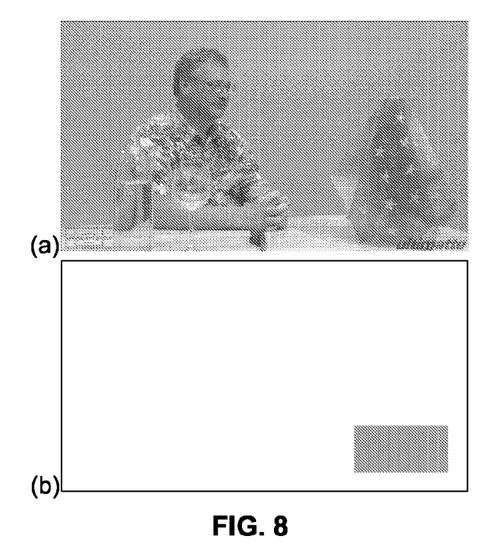
FIG. 8 depicts a primary picture (a) and an auxiliary picture to be used as alpha mask for the logo (b)
Figure 9:
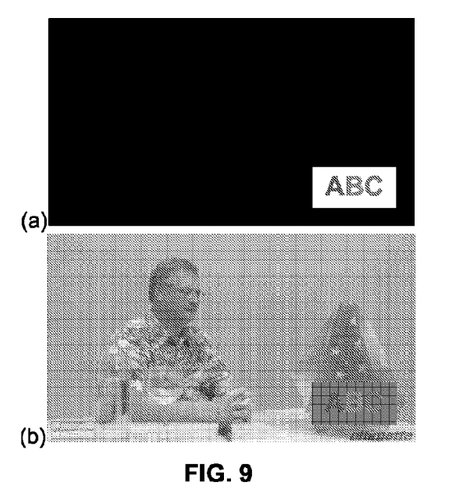
FIG. 9 depicts a background picture (a) and a combined primary picture with a logo (b)

A second embodiment consists in using the auxiliary coded pictures principle to transport background pictures. A background coded picture has the same syntactic and semantic restrictions as a color redundant coded picture, and it contains the same number of macroblocks as the primary coded picture. There are exactly one background coded picture in each access unit of the coded video sequence. The nal_unit_type for background coded pictures is set for instance to 24 and redundant_pic_cnt=0. If present, the background coded picture should immediately follow the auxiliary coded picture if any, else the redundant coded picture(s) if any, else the primary coded picture. The alpha blending formula to use is specified by aux_format_idc. This solution is illustrated by FIGS. 8 and 9.

This proposal is complementary with the auxiliary pictures and the usage of background pictures can be used for other purpose than logo insertion. The removing or replacing of all the logo(s) coded with this solution is straightforward since it is done by only removing or replacing the auxiliary and background pictures. It furthermore allows handling animated logos.

Figure 10:
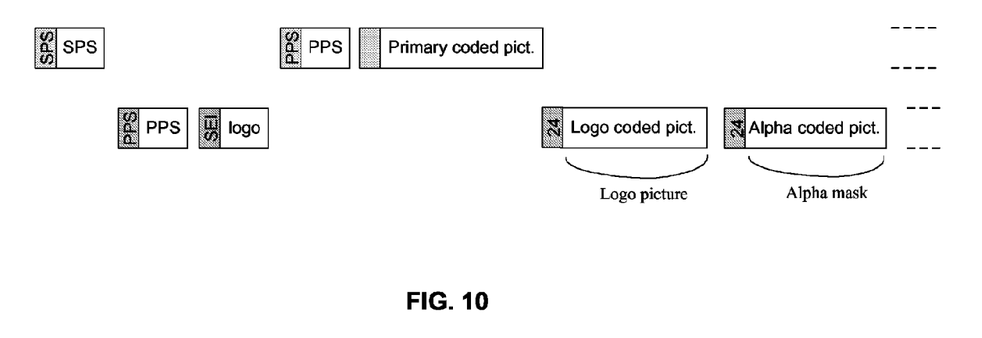
FIG. 10 depicts a typical nal units flow: primary coded pictures nal units on the first line, logo nal units on the second line.

A third embodiment depicted on FIG. 10, consists in using logo slices. More precisely it consists in using FMO for precisely positioning and sizing the logo into the primary pictures, in using monochrome pictures for transporting the alpha mask (like auxiliary pictures) and redundant coded picture syntax for the logo color samples values. This solution consists in creating a new PPS describing a FMO with two slices as in FIG. 7 with the slice group ID 0 corresponding to the logo. This PPS refers to the SPS used by the primary coded picture. It also consists in creating two coded slices using this PPS:

A logo coded slice that has the same syntactic and semantic restrictions as a redundant coded picture, where only the slice group ID 0 is used (the other one is not present) and redundant_pic_cnt=logo_id (cf. SEI logo message syntax described in the last section).

An alpha coded slice that is coded in the same way as auxiliary coded pictures. It is a monochrome picture (chroma_format_idc inferred to be 0), but only the slice group ID 0 is used (the other one is not present) and redundant_pic_cnt=0. The alpha coded slice is not necessary present, but if it is present it should immediately follow the corresponding logo coded slice. These 2 coded slices will have a nal_unit_type byte value equals for instance to 24. All the primary coded slices are not necessary followed by a logo coded slice. One can possibly insert several (nl) logos by using num_slice_groups_minus1=nl. It also consists in creating one SEI logo message for other logo information (e.g. logo display state?). This SEI logo message follows a specific syntax as for example the one described in the last section.

Figure 11:
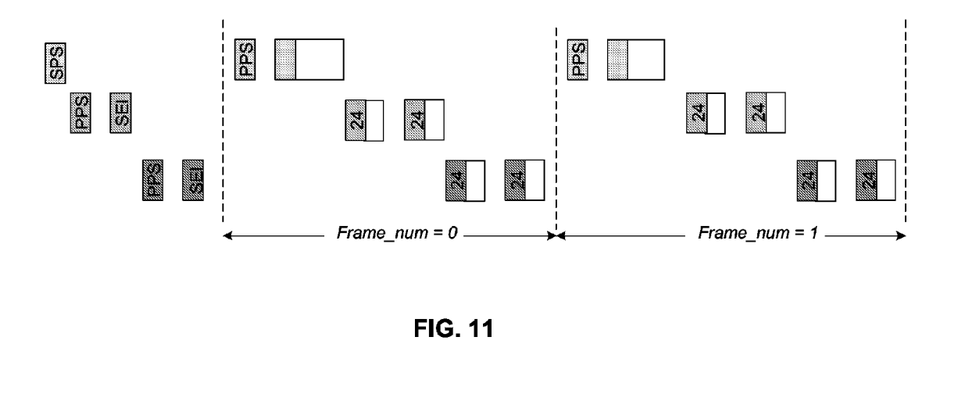
FIG. 11 depicts an example of MPEG-4 AVC stream (first line) with 2 logos (second and third lines)

This third embodiment has the following advantages:
high coding efficiency;
support of animated logos (even pictures in pictures . . . );
support several logos: by the use of multiple logo coded slices;
only based on the re-use of existing syntax and tools (like auxiliary pictures);
adding of new logos is done by adding new PPS, SEI logo message and new logo (and optionally alpha) coded slices as depicted on FIG. 11 on the third line;
removing of existing logos is done by removing the corresponding PPS, SEI logo messages and logo (and alpha) coded slices.

Figure 12:
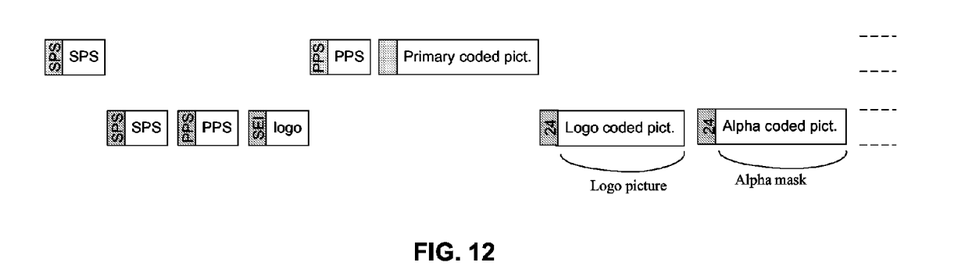
FIG. 12 depicts a typical nal units flow.

A fourth embodiment, depicted on FIG. 12, consists in using logo pictures. Advantageously, it avoids using the FMO (multi-slice) as for previous embodiment. The position of the logo is specified in the SEI logo message. The size of the logo is specified in a new SPS. Therefore, the solution consists in creating a new SPS containing the logo picture size, a new PPS referring to this SPS and a specific SEI message for positioning the logo into the primary pictures (and for other information). The new SPS and PPS are depicted on the second line of FIG. 12. This SEI message follows a specific syntax as for example the one described in the last section.

It also consists in creating two coded pictures using this PPS:
a logo coded picture which is a primary coded picture using the new PPS with a nal_unit_type byte value equals for instance to 24 and redundant_pic_cnt=logo_id.

an optional alpha coded picture which is a monochrome picture (chroma_format_idc inferred to be 0) with a nal_unit_type byte value equals for instance to 24 and redundant_pic_cnt=0.

If the alpha coded picture is present it should immediately follow the logo coded picture. The alpha blending equation uses the alpha blending formula specified for auxiliary pictures with aux_format_idc=1. All the primary coded pictures are not necessary followed by a logo coded slice. This fourth embodiment has the same advantages as the third embodiment. It however does not use multiple slices, i.e. FMO tool.

The SEI messages used by the third and fourth embodiments follow a specific syntax as for example the one described below. To this aim, a SEI message of a new type (for instance payloadType==22) is created. This new SEI message contains in the logo_info(payloadSize) payload some information required to perform a logo insertion at the decoding stage. Three logo states are defined as depicted on FIG. 13: visible, temporary visible, invisible. When set to visible or temporary visible, the logo is displayed. Otherwise (invisible state) the logo is not displayed. Therefore, the decoder should maintain a list of the last SEI logo messages received for each different logo_id values. If the logo corresponding to a given logo_id is in visible or temporary visible state, it should be inserted in all the decoded pictures with picture order count superior or equals to the picture order count of the first NAL unit slice following the SEI logo message, and in all subsequent decoded pictures after picture order count is reset. If the logo corresponding to a given logo_id is in invisible state, it should not be inserted. In this case, the logo coded pictures and alpha coded pictures referring to the pic_parameter_set_id will not be decoded.

An example of syntax extension for MPEG-4 AVC is given below:

SEI Payload Syntax Extension:

| sei_payload( payloadType, payloadSize ) { | C | Descriptor |
|---|---|---|
| if( payloadType == 0 ) | | |
|    buffering_period( payloadSize ) | 5 | |
| ..... | | |
| else if( payloadType == 21 ) | | |
|    stereo_video_info( payloadSize ) | 5 | |
| else if( payloadType == 22 ) | | |
|    logo_info( payloadSize ) | 5 | |
| Else | | |
|    reserved_sei_message( payloadSize ) | 5 | |
| if( !byte_aligned( ) ) { | | |
|    bit_equal_to_one /* equal to 1 */ | 5 | f(1) |
|    while( !byte_aligned( ) ) | | |
|      bit_equal_to_zero /* equal to 0 */ | 5 | f(1) |
| } | | |
| } | | |

Logo Info SEI Message Syntax:

| Logo_info( payloadSize ) { | C | Descriptor |
|---|---|---|
| nb_logo | 5 | ue(v) |
| for ( i=0 ; i<nb_logo ; i++ ) { | | |
|    logo_id | 5 | ue(v) |
|    pic_parameter_set_id | 5 | ue(v) |
|    nb_pictures | 5 | ue(v) |
|    logo_permanent_flag | 5 | u(1) |
|    logo_new_flag | 5 | u(1) |
|    logo_origin_x | 5 | ue(v) |
|    logo_origin_y | 5 | ue(v) |
| } | | |
| } | | | logo_id

Each SEI logo message carries a unique logo number identifier (logo_id). This allows inserting several logos in a decoded video. Additionally, the content creator or the video service provider (TV broadcaster, VOD service, . . . ) can define some specific rules to manage several logos id. If two SEI logo messages have the same logo_id value and logo_new_flag is equal to 1, the last one will replace the previous one. The unique logo number identifier logo_id refers to a pic_parameter_set_id.

pic_parameter_set_id

Each SEI logo message carries a unique pic_parameter_set_id. This allows associating the SEI logo message to the logo coded pictures and alpha coded pictures that use this pic_parameter_set_id.

The pic_parameter_set_id identifies the picture parameter set that is referred to in the logo coded pictures (or slices) and alpha coded pictures (or slices). The value of pic_parameter_set_id shall be in the range of 0 to 255, inclusive.

nb_pictures

In the case of animated logo, nb_picture is the number of logo pictures in the logo sequence animation. For a still logo nb_picture=1. If the number of logo pictures is undetermined nb_picture=0, else the logo sequence loops.

logo_permanent_flag

Figure 13:
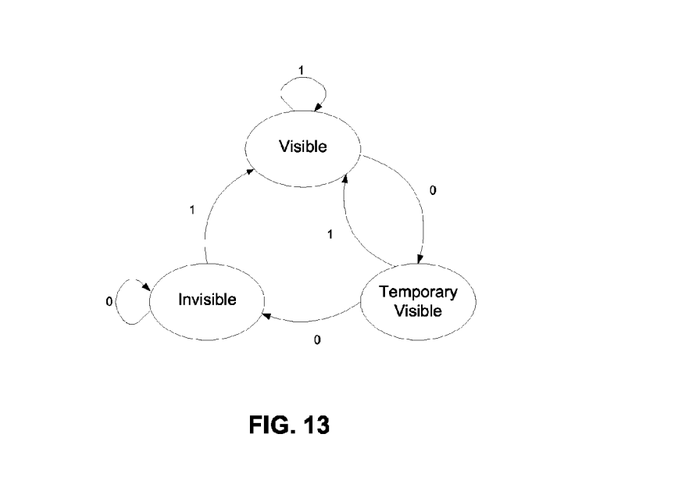
FIG. 13 depicts three different logo states.

The logo_permanent_flag controls the display state of the logo. The state diagram depicts on FIG. 13 gives the possible transitions between these different states.

logo_new_flag

If logo_new_flag is equal to 1, the logo parameters and associated pictures are new and the logo_info( ) payload corresponds to a new logo. Then, if logo state is visible, the logo coded pictures (and alpha coded pictures if any) samples should be decoded and the decoded logo pictures should be inserted.

If logo_new_flag is equal to 0, logo parameters and associated pictures, i.e. the logo_info( ) payload, are the same as in the previous SEI logo message with same logo_id. Consequently, if the logo (and alpha if any) coded pictures have been decoded yet and stored, the logo coded samples can be ignored.

logo_origin_x specifies the horizontal position of the upper-left pixel of the logo picture to be inserted in units of luma samples of current picture.

logo_origin_y specifies the vertical position of the upper-left pixel of the logo picture to be inserted in units of luma samples of current picture.

The last two elements: logo_origin_x and logo_origin_y are only required for the fourth embodiment and could be avoided with the third embodiment.

The proposed solution offers numerous advantages. In particular it makes it possible to easily insert a logo into a sequence of already coded pictures without having to decode it. To do this, it suffices to insert a subset of bits into an existing stream of coded data without needing to decode it. Moreover, it is also easy to delete a logo from a stream of coded data since it suffices to identify for example by virtue of its header HL the part of the stream relating to the logo and to delete the subset of bits corresponding to the logo. Instead of deleting it, it can be replaced with another subset of bits corresponding to another logo. The proposed solution hence allows an unlimited number of cycles of deletion and/or of insertion of logos for one and the same video content without degrading the final quality of this video content. Furthermore, it makes it possible to obtain a better final quality than the traditional solutions since it deletes the step of decoding/re-encoding, and since it avoids the step of concealing the existing logos. Finally, it is independent and compatible with the traditional video processings (post-processing, change of bit rate (known as "transrating"), transcoding, layout, etc). Furthermore, the proposed solution do not require any time synchronization information between the coded data related to the logo and the coded data related to the sequence of images. Indeed the logo information is inserted directly in the video elementary stream. Therefore no system level additional information, e.g. timestamp, is required for synchronizing the coded data related to the logo and the coded data related to the pictures of the sequence. Such solutions are therefore simple and independent from any transport layer (e.g. MPEG-2 TS).

The invention also relates to a decoding method making it possible to decode a stream of coded data generated by the coding method of the invention. The decoding method consists in decoding a first part of the stream of coded data corresponding to data relating to a sequence of pictures so as to generate a sequence of decoded pictures. The method consists furthermore in decoding a second part of the stream of coded data corresponding to coded data relating to the logo, i.e. its various components, its initial size, possibly its display size and the information making it possible to manage transparency effects. The coded data relating to the logo being decoded independently of those relating to the sequence of pictures. The decoding method possibly inserts the logo into the decoded pictures of the sequence according to the decoded information relating to the logo. The insertion of the logo into the pictures of the sequence can also be carried out by a display method distinct from the decoding method.

Figure 4:
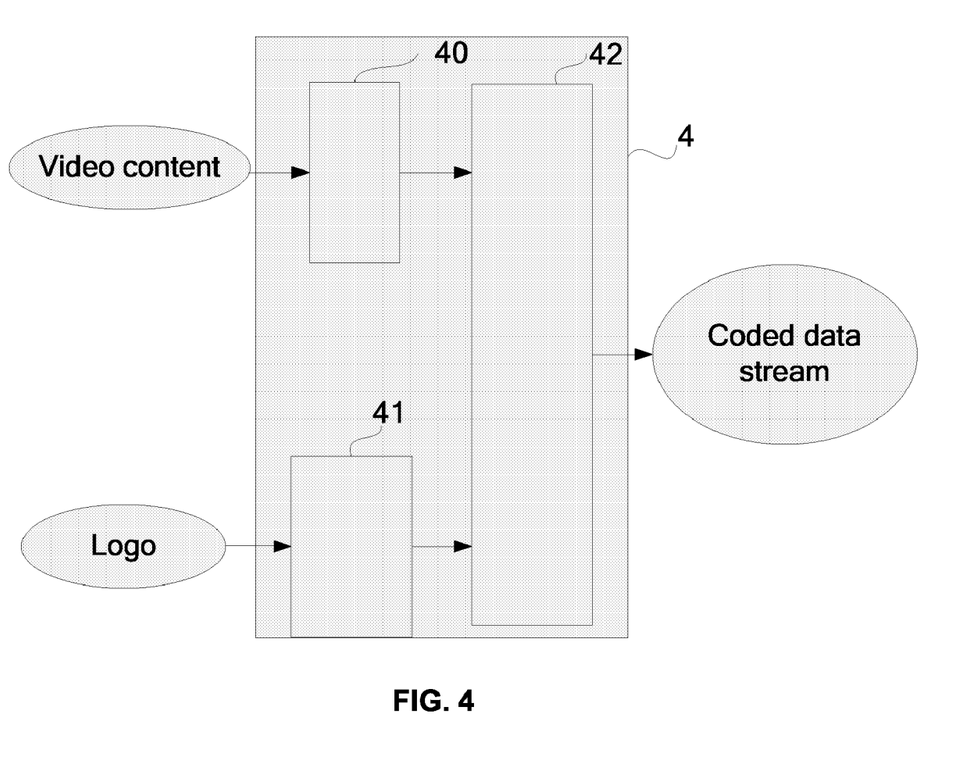
FIG. 4 represents a coding device according to the invention.

The invention relates to a coding device implementing the coding method described previously. It comprises in particular means 40 for coding a sequence of pictures so as to generate a stream of coded data relating to the sequence of pictures, means 41 for coding a logo so as to generate a stream of coded data relating to the logo and means 42 for generating a single stream of coded data comprising separately the coded data relating to the logo and the coded data relating to the sequence. The means for coding the logo are for example a coder of JPEG2000 still pictures. The means for coding the sequence of pictures are for example a coding device in accordance with the MPEG4 AVC standard.

The invention relates furthermore to a decoding device implementing the decoding method described previously. It comprises in particular means for decoding a first part of the stream of coded data corresponding to data relating to the sequence of pictures so as to generate a sequence of decoded pictures. It furthermore comprises means for decoding independently of the sequence of pictures a second part of the stream of coded data corresponding to coded data relating to the logo, i.e. its various components, its initial size, possibly its display size and the information making it possible to manage transparency effects. Optionally, it comprises means for inserting the logo into the sequence of decoded pictures according to the decoded information relating to the logo. The insertion means can also be integrated into a display device distinct from the coding device.

Of course, the invention is not limited to the exemplary embodiments mentioned above. In particular, the person skilled in the art can introduce any variant to the embodiments set forth and combine them so as to benefit from their various advantages. In particular, two different logos can be coded in two SEI messages. Specifically, it is conceivable to use a first logo with a first part of the sequence and a second logo with a second part of the sequence. It is of course conceivable to code more than two logos.

The invention claimed is:

1. A method for coding a video content including a sequence of pictures and at least one logo, said method comprising a step for coding said sequence of pictures, said step generating a stream of coded data relating to said sequence of pictures, wherein said method further comprises the following steps:

coding said at least one logo and additional information relating to said at least one logo, said additional information comprising at least information relating to the positioning of said at least one logo in the pictures of said sequence, said step generating coded data relating to said at least one logo wherein at least part of said coded data relating to said at least one logo is coded as a supplemental enhancement information message; and generating a single video data stream comprising separately said coded data relating to said at least one logo and said coded data relating to said sequence of pictures by inserting the coded data relating to said at least one logo directly in said stream of coded data relating to said sequence of pictures.

2. The method according to claim 1, wherein said additional information relating to said at least one logo furthermore comprises information relating to the initial size of said at least one logo.

3. The method according to claim 1, wherein said additional information relating to said at least one logo furthermore comprises information making it possible to manage the transparency of said at least one logo during its display.

4. The method according to claim 1, wherein said sequence of pictures is coded with a coding method compatible with one of the coding standards belonging to the set of standards comprising:
MPEG-2;
MPEG-4 part 2; and
MPEG-4 AVC.

5. The method according to claim 1, wherein said at least one logo is coded with a coding method compatible with one of the coding standards belonging to the set of standards comprising:
MPEG-2;
MPEG-4 part 2;
MPEG-4 AVC;
JPEG; and
JPEG 2000.

6. A coding device for coding a video content comprising a sequence of pictures and at least one logo, said coding device comprising means for coding said sequence of pictures, said means generating a stream of coded data relating to said sequence of pictures, wherein said coding device further comprises:

means for coding said at least one logo and additional information relating to said at least one logo, said additional information comprising at least information relating to the positioning of said at least one logo in the pictures of said sequence, said means generating coded data relating to said at least one logo wherein at least part of said coded data relating to said at least one logo is coded as a supplemental enhancement information message; and means for generating a single video data stream comprising separately said coded data relating to said at least one logo and said coded data relating to said sequence of pictures by inserting the coded data relating to said at least one logo directly in said stream of coded data relating to said sequence of pictures.

7. The method according to claim 1, wherein said additional information relating to said at least one logo further comprises information relating to the display size of said at least one logo.

8. The method according to claim 1, wherein the coded data relating to said at least one logo are inserted in said stream of coded data relating to said sequence of pictures only at a random access point.

9. A method for decoding a video content including a sequence of pictures and at least one logo, said method comprising a step for decoding a stream of coded data relating to said sequence of pictures and to said at least one logo, wherein said method further comprises the following steps:

decoding a first part of said stream of coded data into a sequence of decoded pictures;

decoding a second part of said stream of coded data into said at least one logo and into additional information relating to said at least one logo, said additional information comprising at least information relating to the positioning of said at least one logo in the decoded pictures, wherein at least part of said second part is a supplemental enhancement information message; and inserting said at least one logo into the decoded pictures according to said additional information.

10. The method according to claim 9, wherein said additional information relating to said at least one logo further comprises information relating to the initial size of said at least one logo.

11. The method according to claim 9, wherein said additional information relating to said at least one logo further comprises information making it possible to manage the transparency of said at least one logo during its display.

12. The method according to claim 9, wherein said additional information relating to said at least one logo further comprises information relating to the display size of said at least one logo.

13. The method according to claim 9, wherein the at least one logo is inserted in the decoded pictures following a random access point decoded just before the at least one logo until a next random access point.

14. A decoding device for decoding a video content comprising a sequence of pictures and at least one logo, said decoding device comprising means for decoding a stream of coded data relating to said sequence of pictures and to said at least one logo, wherein said device further comprises:

means for decoding a first part of said stream of coded data into a sequence of decoded pictures;

means for decoding a second part of said stream of coded data into said at least one logo and into additional information relating to said at least one logo, said additional information comprising at least information relating to the positioning of said at least one logo in the decoded pictures, wherein at least part of said second part is a supplemental enhancement information message; and means for inserting said at least one logo into the decoded pictures according to said additional information.

* * * * *